C. A. TAEPKE.
ILLUMINATING DEVICE.
APPLICATION FILED FEB. 19, 1909.
1,000,129.
Patented Aug. 8, 1911.
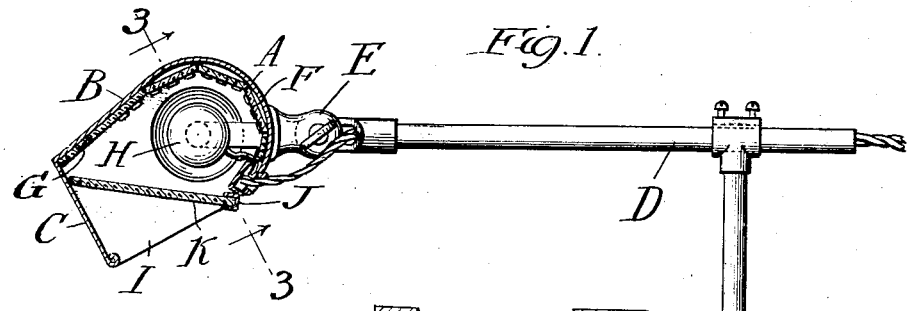
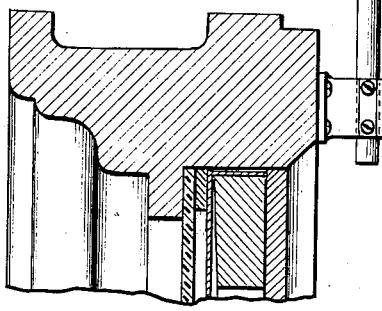
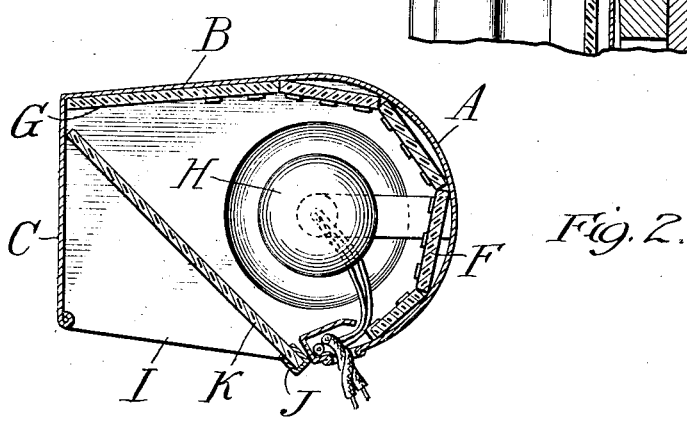
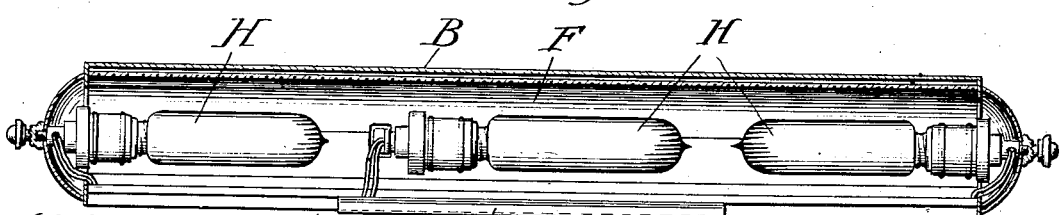

UNITED STATES PATENT OFFICE.

CHARLES A. TAEPKE, OF CHICAGO, ILLINOIS, ASSIGNOR TO M. O'BRIEN & SON, OF CHICAGO, ILLINOIS, A CORPORATION OF ILLINOIS.

ILLUMINATING DEVICE.

1,000,129.  Specification of Letters Patent.  Patented Aug. 8, 1911.

Application filed February 19, 1909. Serial No. 479,004.

*To all whom it may concern:*

Be it known that I, CHARLES A. TAEPKE, a citizen of the United States, residing at Chicago, in the county of Cook and State of Illinois, have invented certain new and useful Improvements in Illuminating Devices; and I do hereby declare the following to be a full, clear, and exact description of the invention, such as will enable others skilled in the art to which it appertains to make and use the same.

This invention relates to a novel construction in a device for illuminating pictures such as oil paintings and the like, the object being to provide a device of this character by means of which an efficient and substantially uniform illumination of all parts of the picture may be obtained, and consists in the features of construction and combinations of parts hereinafter fully described and claimed.

In the accompanying drawings illustrating this invention: Figure 1 is a vertical sectional view showing an illuminating device constructed in accordance with my invention, properly mounted on a picture frame. Fig. 2 is a similar section on an enlarged scale of the body portion of the illuminating device. Fig. 3 is a vertical longitudinal section of the same on the line 3—3 of Fig. 1.

To illuminate oil paintings and the like it is customary to place a reflector above the picture in which incandescent electric lamps are disposed, the light from which is thrown upon the picture but not into the room on a wall of which the picture is hung. Owing to the close proximity of the reflector and the contained lamps to the top of the picture the upper portion of the latter is more strongly illuminated than the lower portion thereof. In landscapes and portraits the upper portion of the picture is usually very much lighter in coloring than the lower portion thereof, and accordingly the lighter portion reflects the light so much more strongly as to produce a glare which makes said portion so much more conspicuous than the lower portion of the picture as to destroy the balance and harmonious effect to a very large extent. It has been sought in many ways to overcome this defect in illumination but heretofore so far as I am informed no adequate means of properly distributing the light has been provided.

The object of my present invention is to provide means whereby the strongest light from the illuminating device is thrown upon the lower portion of the picture and the light then properly diffused over the upper portion so as to properly balance the illumination and convey to the eye the proper balance of all parts of the picture.

Proper illumination has always been conceived by artists and connoisseurs to consist in throwing a curtain of light in front of and parallel with rather than upon the painting itself, said curtain of light acting by reflection to illuminate the picture rather than by the direct concentration of the light thereon. This however, when carried out in practice serves more particularly to illuminate the upper or lighter portions of the picture leaving the lower and darker portions obscure and thereby producing greater contrasts than are actually present in the painting.

My invention is based upon the theory that the light should be concentrated upon that portion of the picture which is farthest removed from the source thereof and such light should be then deflected and diffused upon the upper portions of the picture, thus throwing the strongest light upon what is generally the darkest part of a picture and a dimmer light upon the upper and generally lighter portions of the picture, and thereby balancing the illumination of the whole and bringing out the proper relative color values and harmonies.

My said device comprises a casing which is substantially semi-cylindrical at one end as at A, said portion terminating at one end in a flange B which at its free end is provided with a flange C opposing the open end portion or mouth of the portion A. This said casing is adjustably mounted in the usual manner upon the supporting bracket D which is secured to the picture, the said supporting device enabling the said reflector to be adjusted as to height and projection beyond the front face of the picture while the pivotal connection E of the reflector therewith enables the latter to be swung so as to throw the rays of light in any desired direction upon the desired portions of the painting. The said portion A of said casing and the flange B thereof are lined interiorly with mirrors F and G secured in any well-known or suitable manner. Incandescent electric lamps H varying in number in accordance with the length of the reflector are suitably mounted substantially axially of the portion A of the casing and the light therefrom thrown upon said mirrors F and G is reflected at various angles and thus a strong light is thrown from the mouth I of the device. The other edge of the portion A of said casing is provided midway between its ends with a U-shaped guide groove J in which one edge of a plate K of glass is adapted to be received, the latter being supported at its opposite edge on the upper end portion of the flange C, which is devoid of reflecting surface and preferably blackened on its inner face to prevent reflection of light thereby. Said flange serves particularly as a shield to hide the interior of the device from view and consequently to prevent projection of rays into the room. The said plate K of glass is preferably ground on one face and may be colored with any transparent coloring medium, to light or dark yellow or orange or other suitable tints depending upon the coloring of the painting and the effect desired to be produced. One or more of said plates K may be used according to the width of the painting and depending upon the desired manner of diffusing light over the upper portion of the picture or upon different parts thereof. The said plate acts to diffuse the rays of light passing through the same and increases the area illuminated.

In practice the device is mounted substantially as shown in Fig. 1. The exact position of the illuminator with respect to the painting depends upon the length of the latter and the effect desired to be produced. Generally speaking however, the said device is so disposed as to concentrate the direct or mirror reflected rays emerging from the mouth I upon the lower end portion of the painting leaving the upper portion of the latter in shadow. The plate or plates K are then inserted as shown in Figs. 1 and 2 and serve to deflect some of the rays to throw the same upon the upper portion of the picture. The position or positions of the plate or plates K may be adjusted so as to deflect the rays more particularly over the middle portion or over the corner portions of the picture or both, thereby bringing out the full color value of the same. The adjustment of position of the device and the coloring, size, number and position of the plates K is dependent upon the judgment of the artist or the person hanging the picture, but the result produced differs very materially from that produced by the reflectors at present generally used, by throwing a diffused soft light in place of a direct and glaring light upon the painting. It also enables any particular portion of the picture to be maintained partially in shadow and other portions to be relatively more strongly illuminated.

I claim as my invention:

1. A device of the kind specified comprising a casing having a substantially semi-cylindrical wall terminating on one edge in an L-shaped flange, there being an open space between the free end of said flange and the edge of said semi-cylindrical wall through which light is projected, a lamp disposed axially with relation to said semi-cylindrical wall, and light diffusing means disposed between said lamp and said open space in the path of some of the projected rays, substantially as and for the purpose specified.

2. A device of the kind specified, comprising a casing equipped interiorly with lamps disposed in a row, light reflectors partially surrounding and disposed substantially equidistantly from said row of lamps, one wall of said casing opposing said reflectors and bordering a slot in said casing through which the rays are adapted to be projected upon the object to be illuminated, and a plate of ground glass of greater width than said slot interposed between the latter and said lamps and reflectors and angularly disposed relatively to said slot and said wall opposing said reflectors.

3. A device of the kind specified, comprising a casing equipped interiorly with lamps disposed in a row, light reflectors partially surrounding and disposed substantially equidistantly from said row of lamps, one wall of said casing opposing said reflectors and bordering a slot in said casing through which the rays are adapted to be projected upon the object to be illuminated, the face of said wall opposing said reflectors being covered with a light absorbing coating, and a plate of ground glass of greater width than said slot interposed between the latter and said lamps and reflectors and angularly disposed relatively to said slot and said wall opposing said reflectors.

In testimony whereof I have signed my name in presence of two subscribing witnesses.

CHARLES A. TAEPKE.

Witnesses:
RUDOLPH WM. LOTZ,
A. W. NEWCOMB.